US011562422B2

(12) United States Patent
Soppin et al.

(10) Patent No.: US 11,562,422 B2
(45) Date of Patent: Jan. 24, 2023

(54) SYSTEM AND METHOD OF SHOPPING USING A VIRTUAL REALITY DEVICE AND AN AVATAR

(71) Applicant: Wipro Limited, Bangalore (IN)

(72) Inventors: Shashidhar Soppin, Bangalore (IN); Manjunath Ramachandra Iyer, Bangalore (IN); Chandrashekar Bangalore Nagaraj, Bangalore (IN)

(73) Assignee: Wipro Limited, Bangalore (IN)

( * ) Notice: Subject to any disclaimer, the term of this patent is extended or adjusted under 35 U.S.C. 154(b) by 380 days.

(21) Appl. No.: 16/836,021

(22) Filed: Mar. 31, 2020

(65) Prior Publication Data

US 2021/0256597 A1 Aug. 19, 2021

(30) Foreign Application Priority Data

Feb. 17, 2020 (IN) .............................. 202041006810

(51) Int. Cl.
| | |
|---|---|
| *G06Q 30/06* | (2012.01) |
| *G06N 3/04* | (2006.01) |
| *H04L 9/40* | (2022.01) |
| *G06T 19/00* | (2011.01) |

(52) U.S. Cl.
CPC ........... *G06Q 30/0641* (2013.01); *G06N 3/04* (2013.01); *G06T 19/003* (2013.01); *G06T 19/006* (2013.01); *H04L 63/0853* (2013.01)

(58) Field of Classification Search
CPC .... G06Q 30/0641; G06N 3/04; G06T 19/003; G06T 19/006; H04L 63/0853
See application file for complete search history.

(56) References Cited

U.S. PATENT DOCUMENTS

| | | | |
|---|---|---|---|
| 10,719,993 B1* | 7/2020 | Ha | ........................ G06V 10/40 |
| 11,221,213 B2* | 1/2022 | Abovitz | ................ G06F 3/0487 |
| 2005/0177463 A1 | 8/2005 | Crutchfield, Jr. et al. | |
| 2019/0066198 A1* | 2/2019 | Keeler | ................ G06F 3/04815 |
| 2020/0117336 A1* | 4/2020 | Mani | ........................ G06F 8/60 |
| 2020/0126370 A1* | 4/2020 | Zalewski | ............. G07G 1/0072 |

FOREIGN PATENT DOCUMENTS

CN 103544636 A 1/2014

* cited by examiner

*Primary Examiner* — Nicholas Augustine
(74) *Attorney, Agent, or Firm* — Finnegan, Henderson, Farabow, Garrett & Dunner, LLP

(57) ABSTRACT

The present invention relates to a method of purchasing one or more goods from a physical store through a virtual environment. The method includes obtaining one or more physical store details and one or more user details from a user device for authenticating a physical user. Further, a unique avatar indicative of a virtual user corresponding to the physical user is generated. Furthermore, the virtual environment comprising one or more virtual stores is generated from a real-time video. The virtual environment is provided to the user device. Subsequently, an optimal path for traversing the virtual user in the virtual environment is determined in real-time based on one or more shopping details and a time period associated with the one or more shopping details. Finally, the virtual user is navigated in the one or more virtual stores through the optimal path for purchasing the one or more goods.

20 Claims, 10 Drawing Sheets

SYSTEM AND METHOD OF SHOPPING USING A VIRTUAL REALITY DEVICE AND AN AVATAR

TECHNICAL FIELD

The present disclosure relates to the field of virtual reality and augmented reality. Particularly, but not exclusively, the present disclosure relates to a method of shopping using a virtual reality device and an avatar.

BACKGROUND

In recent times, purchasing one or more goods via an e-commerce merchant has increased rapidly. Users prefer e-commerce merchants over retail shopping because of limited availability of parking space, increased travelling time due to traffic, and increased waiting time for billing requests. The users willing to purchase the one or more goods from an e-commerce merchant accesses a two-dimensional image-based online home shopping site, searches for words including the name of the one or more goods, specification of the one or more goods, and price of the one or more goods, category search related to the one or more goods, and image search of the one or more goods. Based on the search result provided by the e-commerce merchant, the users purchase the one or more goods.

For purchasing the one or more goods from the e-commerce merchant, the users have to manually input search queries. Further, looking for the item of interest consumes more time in running multiple queries. Further, the results provided by the e-commerce merchant may be inaccurate. Further, the users do not undergo a shopping experience similar to the retail shopping, where the users get to see the one or more goods in a three dimension, compare the one or more goods with similar goods in a store. Further, the users cannot experience the interaction with other users purchasing the in the store and lack the assistance provided by the store managers regarding the one or more goods in the store.

The information disclosed in this background of the disclosure section is only for enhancement of understanding of the general background of the invention and should not be taken as an acknowledgement or any form of suggestion that this information forms the prior art already known to a person skilled in the art.

SUMMARY

Other embodiments and aspects of the disclosure are described in detail herein and are considered a part of the claimed disclosure.

Disclosed herein is a method of purchasing one or more goods from a physical store through a virtual environment. The method includes obtaining one or more physical store details and one or more user details from a user device for authenticating a physical user. Upon successful authentication of the physical user, the method further includes generating a unique avatar indicative of a virtual user corresponding to the physical user based on the one or more user details. Furthermore, the method includes generating the virtual environment comprising one or more virtual stores from a real-time video corresponding to one or more physical stores based on the one or more physical store details, wherein the virtual environment is provided to the user device. Subsequently, the method includes determining in real-time, an optimal path for traversing the virtual user in the virtual environment based on one or more shopping details and a time period associated with the one or more shopping details, received from the physical user. Finally, the method includes navigating the virtual user in at least one of the one or more virtual stores in the virtual environment through the optimal path for purchasing the one or more goods from the physical store corresponding to the at least one of the one or more virtual stores.

Embodiments of the present disclosure discloses a computing system, for purchasing one or more goods from a physical store through a virtual environment. The computing system includes a processor and a memory communicatively coupled to the processor, where the memory stores the processor executable instructions, which, on execution, causes the processor to obtain one or more physical store details and one or more user details from a user device for authenticating a physical user. Upon successful authentication of the physical user, the processor is further configured to generate a unique avatar indicative of a virtual user corresponding to the physical user based on the one or more user details. Furthermore, the processor is configured to generate the virtual environment comprising one or more virtual stores from a real-time video corresponding to one or more physical stores based on the one or more physical store details, wherein the virtual environment is provided to the user device. Subsequently, the processor is configured to determine, in real-time, an optimal path for traversing the virtual user in the virtual environment based on one or more shopping details and a time period associated with the one or more shopping details, received from the physical user. Finally, the processor is configured to navigate the virtual user in at least one of the one or more virtual stores in the virtual environment through the optimal path for purchasing the one or more goods from the physical store corresponding to the at least one of the one or more virtual stores.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
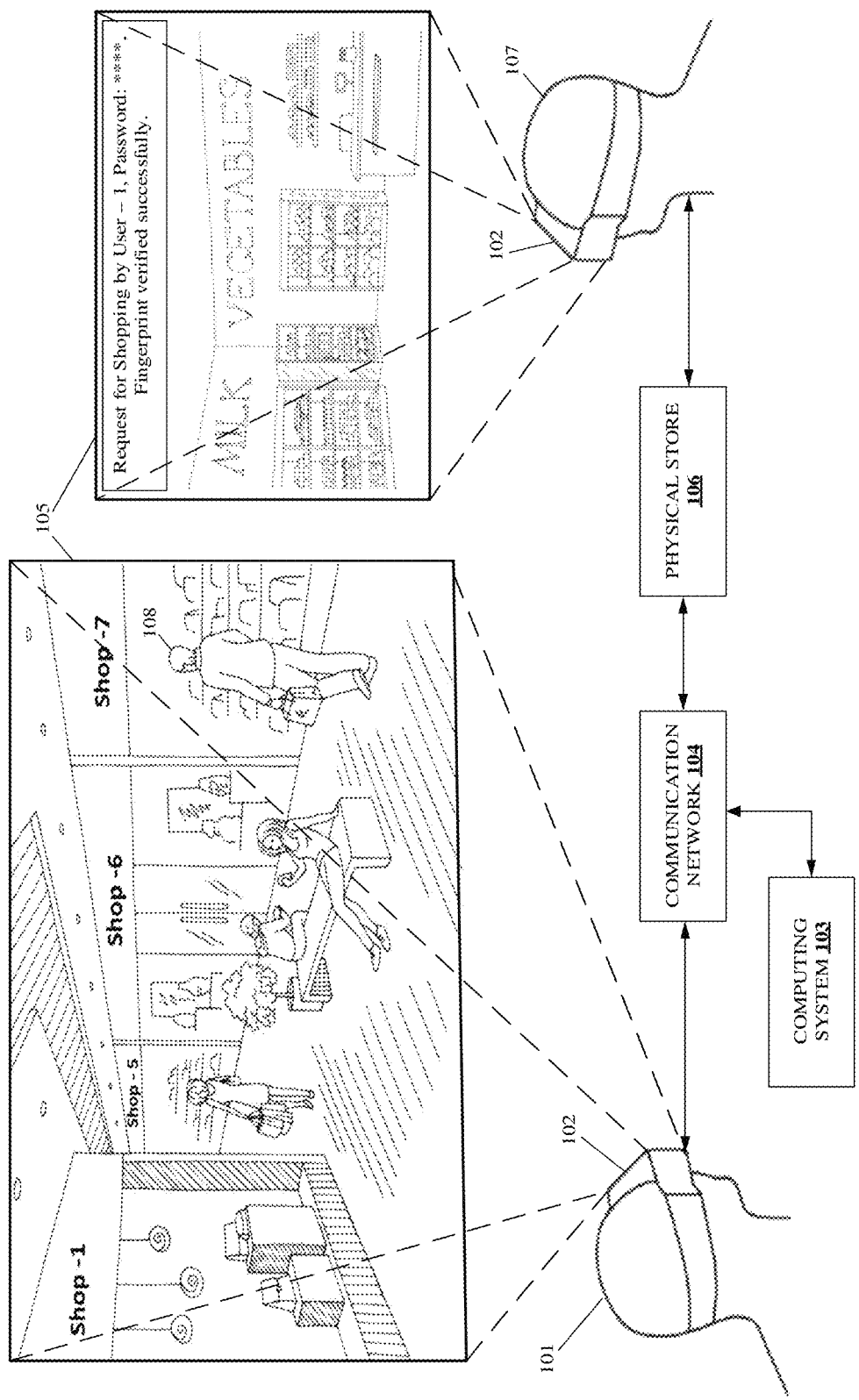
FIG. 1 shows an exemplary environment for purchasing one or more goods from a physical store through a virtual environment, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

The present disclosure describes a method of purchasing one or more goods from a physical store through a virtual environment. The method includes obtaining one or more physical store details and one or more user details from a user device for authenticating a physical user. Upon successful authentication of the physical user, the method further includes generating a unique avatar indicative of a virtual user corresponding to the physical user based on the one or more user details. Furthermore, the method includes generating the virtual environment comprising one or more virtual stores from a real-time video corresponding to one or more physical stores based on the one or more physical store details, wherein the virtual environment is provided to the user device. Subsequently, the method includes determining in real-time, an optimal path for traversing the virtual user in the virtual environment based on one or more shopping details and a time period associated with the one or more shopping details, received from the physical user. Finally, the method includes navigating the virtual user in at least one of the one or more virtual stores in the virtual environment through the optimal path for purchasing the one or more goods from the physical store corresponding to the at least one of the one or more virtual stores.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for purchasing one or more goods from a physical store through a virtual environment using a Virtual Reality (VR) device, in accordance with some embodiments of the present disclosure.

In an embodiment, a physical user (101) may use a Virtual Reality (VR) device (102) (i.e. user device (102)) for purchasing the one or more goods from the physical store. The phrase "VR device (102)" and the phrase "user device (102)" is used interchangeably in the present disclosure. The VR device (102) may provide a virtual environment (105) to the physical user (101) via a display device associated with the VR device (102). The physical user (101) may provide inputs to the VR device (102) via at least one of a text input, audio input, gestures, and the like using a suitable interface for example, a keyboard, a mouse, a microphone, a camera and the like. The VR device (102) controls a virtual user corresponding to the physical user (101) using the provided inputs. In an embodiment, the VR device (102) may be connected to a computing system (103) via a communication network (104) for enabling the physical user (101) to purchase the one or more goods. The computing system (103) may be housed in the VR device (102). In another embodiment, the computing system (103) may be housed in a server (not shown in Figure) remotely connected to the VR device (102).

In an embodiment, the computing system (103) may obtain one or more physical store details and one or more user details from a user device (102) for authenticating a physical user (101). The one or more physical store details may include for example, Store Name: "Store—A"
Location: "location—B" and
Type: "Grocery".

The one or more user details may include for example, user credentials (i.e. a username, a password and the like.), a biometric data (i.e. a fingerprint, a facial image and the like), a one-time password. The computing system (103) may provide at least one of the biometric data, and the one-time password to a store coordinator (107) for verification. The store coordinator (107) may be a physical person in charge of the physical store (106). For example, the store coordinator (107) may be a manager, a supervisor and the like. The store coordinator (107) may be connected to the computing system (103) via the VR device (102) and the communication network (104). The communication network (104) may include, for example, a direct interconnection, enterprise network, a Peer to Peer (P2P) network, Local Area Network (LAN), Wide Area Network (WAN), wireless network (e.g., using Wireless Application Protocol (WAP)), the Internet, Wireless Fidelity (Wi-Fi), cellular network, and the like. Further, the store coordinator (107) verifies at least one of the biometric data, and the one-time password provided by the physical user (101). The store coordinator (107) may provide the result of verification indicating one of a successful authentication or an unsuccessful authentication to the computing system (103) via the VR device (102).

In an embodiment, the computing system (103), upon successful authentication of the physical user (101), may generate a unique avatar indicative of the virtual user corresponding to the physical user (101). The avatar is generated based on the one or more user details using a Convolution neural network (CNN) based Artificial Intelligence (AI) technique. The one or more user details may include at least one of user credentials, a user age, a user gender, a user preferences, a biometric data, a one-time password and a payment information. For example, for the physical user (101) of age "60" and the user gender as "male" an avatar resembling a old person and for the physical user (101) of age "10" and the user gender as "female" an avatar resembling a kid may be generated. The avatar may be a graphic image or a humanoid resembling the physical user (101). Further, the computing system (103) may generate the virtual environment (105) comprising one or more virtual stores from a real-time video corresponding to one or more physical stores. The computing system (103) based on the physical store details, may receive the real-time video corresponding to the physical store captured by a plurality of cameras housed at convenient locations in the physical store. The computing system (103) generates the virtual environment (105) based on the real-time video using the one or more virtual reality techniques and one or more augmented reality techniques. The virtual environment (105) along with the virtual user is provided to the physical user (101) via the VR device (102).

In an embodiment, the computing system (103) may determine in real-time, an optimal path for traversing the virtual user in the virtual environment (105) based on one or more shopping details and a time period associated with the one or more shopping details, received from the physical user (101). For example, the one or more shopping details and a time period may be "Purchase milk, curd, rice, fruits and vegetables from a grocery store, shirts and handbag from an apparels store within a time period of 30 minutes". The computing system (103) may provide the one or more shopping details and the time period as an input to a graph neural network and the graph neural network generates the optimal path as an output. For example, the optimal path may indicate "To buy the shirts and handbag first due to less queue in the apparels store followed by the milk, curd, rice, fruits and vegetables from the grocery store." In general, optimal path is indicative of an order in which the one or more racks is to be visited by the virtual user for purchasing the one or more goods.

In an embodiment, the computing system (103) may navigate the virtual user in at least one of the one or more virtual stores in the virtual environment (105) through the optimal path for purchasing the one or more goods from the physical store corresponding to the at least one of the one or more virtual stores. The physical user (101) via the VR device (102) may purchase the one or more goods in the virtual environment (105). Further, the physical user (101) may initiate a payment transaction after purchasing the one or more goods based on a user credentials. The computing system (103) may indicate to the store coordinator (107) of the one or more physical stores regarding the one or more goods purchased by the physical user (101) in the virtual environment (105). The one or more goods may be provided to the physical user (101) from the physical store after the successful completion of the payment transaction.

Figure 2A:
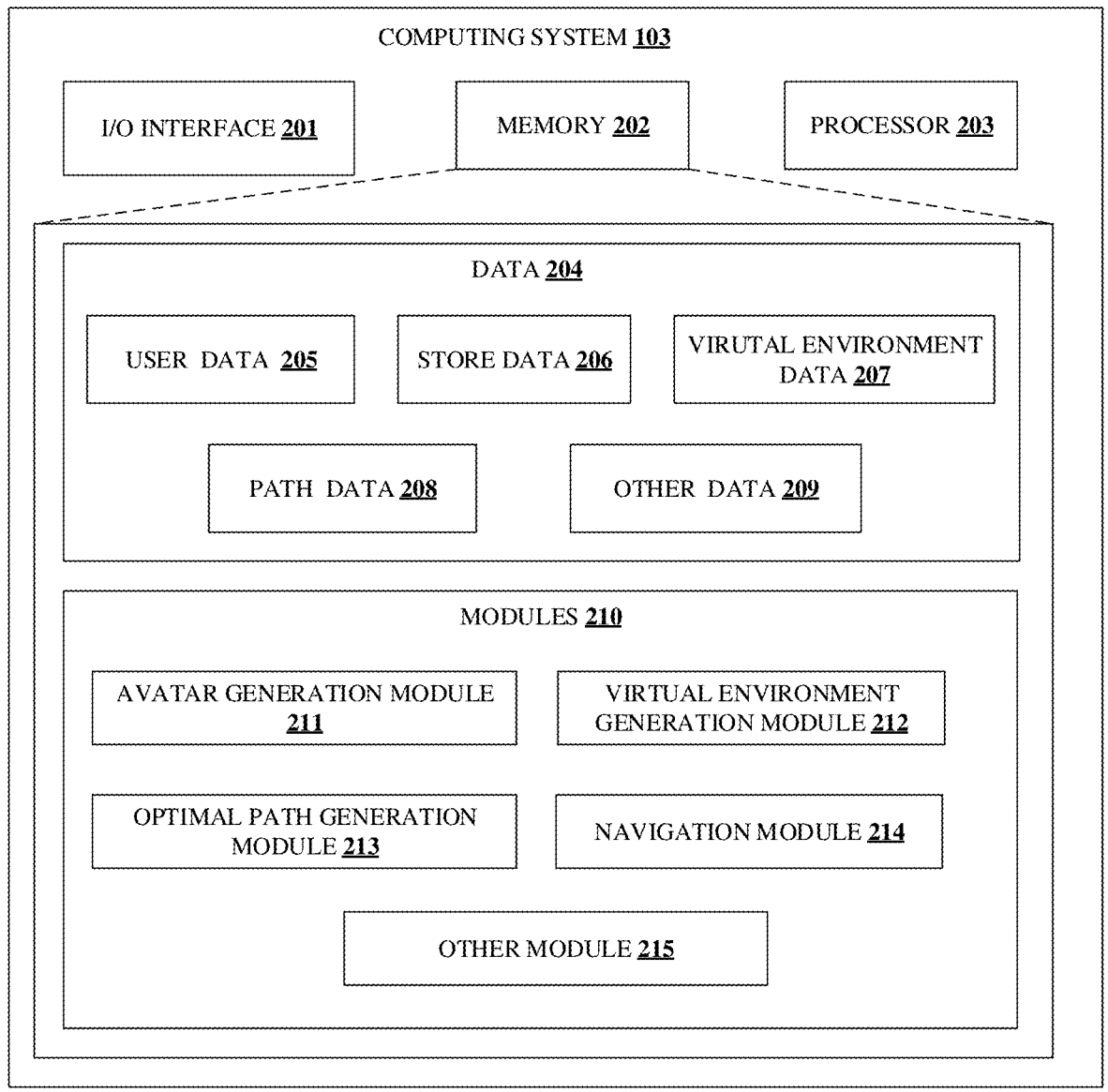
FIG. 2A shows a detailed block diagram of a computing system, in accordance with some embodiments of the present disclosure.

FIG. 2A shows a detailed block diagram of the computing system (103), in accordance with some embodiments of the present disclosure.

The computing system (103) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The computing system (103) further includes an Input/Output (I/O) interface (201). The I/O interface (201) may be coupled with the processor (203) through which an input signal or/and an output signal may be communicated. In one embodiment, the one or more parameters may be received through the I/O interface (201).

In some implementations, the computing system (103) may include data (204) and modules (208). As an example, the data (204) and modules (208) may be stored in the memory (202) configured in the computing system (103). In one embodiment, the data (204) may include, for example, user data (205), a store data (206), a virtual environment data (207), a path data (208) and other data (209). In the illustrated FIG. 2A, data (204) are described herein in detail.

In an embodiment, the user data (205) may include the one or more user details associated with the physical user (101). The one or more details may include at least one of user credentials, a user age, a user gender, a user preferences, a biometric data, a one-time password and a payment information. For example, the user credentials may include a name associated with the physical user (101), a static password to interact with the virtual environment (105) via the VR device (102), the user age may be value in a range of 10 to 90, the user gender may include "Male" or "Female", the user preferences may include frequently purchased (or user-preferred) one or more goods, frequently visited (or user-preferred) one or more physical stores and the like, the biometric data may include a fingerprint, a facial information, iris information and the like, and the payment information may include a payment card number, CVV, expiry date, internet banking information, e-wallet payment information and the like.

In an embodiment, the store data (206) may include the one or more physical store details. The one or more physical store details may include at least one of a name, a location, and a type of the physical store. For example, the one or more physical store details may be "Store—1" at "location—1" and the type "Apparel Store"

In an embodiment, the virtual environment data (207) may include at least one of the virtual environment (105) generated based on the real-time video, the virtual user, a virtual store coordinator corresponding to the store coordinator (107), and other virtual users interacting with the virtual environment (105) corresponding to the one or more physical stores. The virtual environment (105) may include a three-dimensional image corresponding to one or more objects present in the real time video. The one or more objects for example, may include at least one of the one or goods, one or more departments (or one or more shops) in the one or more physical stores, one or more physical users in the one or more physical stores and the like. Further, the virtual environment data (207) may include coordinates of the virtual user, other virtual user, virtual store coordinator, and one or more physical users in the virtual environment (105). The person skilled in the art may appreciate the presence of the one or more objects in the virtual environment (105) generated using the real-time video.

In an embodiment, the path data (208) may include at least one of the one or more shopping details comprising the one or more goods to be purchased from at least one of the one or more virtual stores within the time period, the optimal path generated using the graph neural network, a current state vector, a restriction vector and an exception vector. For example, the one or more shopping details may include [Fruits, vegetables] to be purchased in 10 minutes. Further, the optimal path is indicative of an order in which the one or more racks is to be visited by the virtual user for purchasing the one or more goods.

In an embodiment, the other data (209) may include at least one of the real-time video corresponding to the one or more physical stores, one or more cryptographic techniques for authenticating the physical user (101), one or more user details corresponding to the one or more physical users enrolled for shopping through the virtual environment (105) and the like.

In some embodiments, the data (204) may be stored in the memory (202) in form of various data structures. Additionally, the data (204) may be organized using data models, such as relational or hierarchical data models. The other data (207) may store data, including temporary data and temporary files, generated by the modules (208) for performing the various functions of the computing system (103).

In some embodiments, the data (204) stored in the memory (202) may be processed by the modules (208) communicatively coupled to the processor (203) of the computing system (103). The modules (208) may be stored within the memory (202). In one embodiment, the modules (208) may be present outside the memory (202) as shown in FIG. 2A and implemented as hardware. As used herein, the term modules (208) may refer to an Application Specific Integrated Circuit (ASIC), a FPGA (Field Programmable Gate Array), an electronic circuit, a processor (shared, dedicated, or group) that execute one or more software or firmware programs, a combinational logic circuit, and/or other suitable components that provide the described functionality.

In one implementation, the modules (210) may include, for example, an avatar generation module (211), a virtual environment generation module (212), an optimal path generation module (213), a navigation module (214) and other module (215). It may be appreciated that such aforementioned modules (210) may be represented as a single module or a combination of different modules.

Figure 2B:
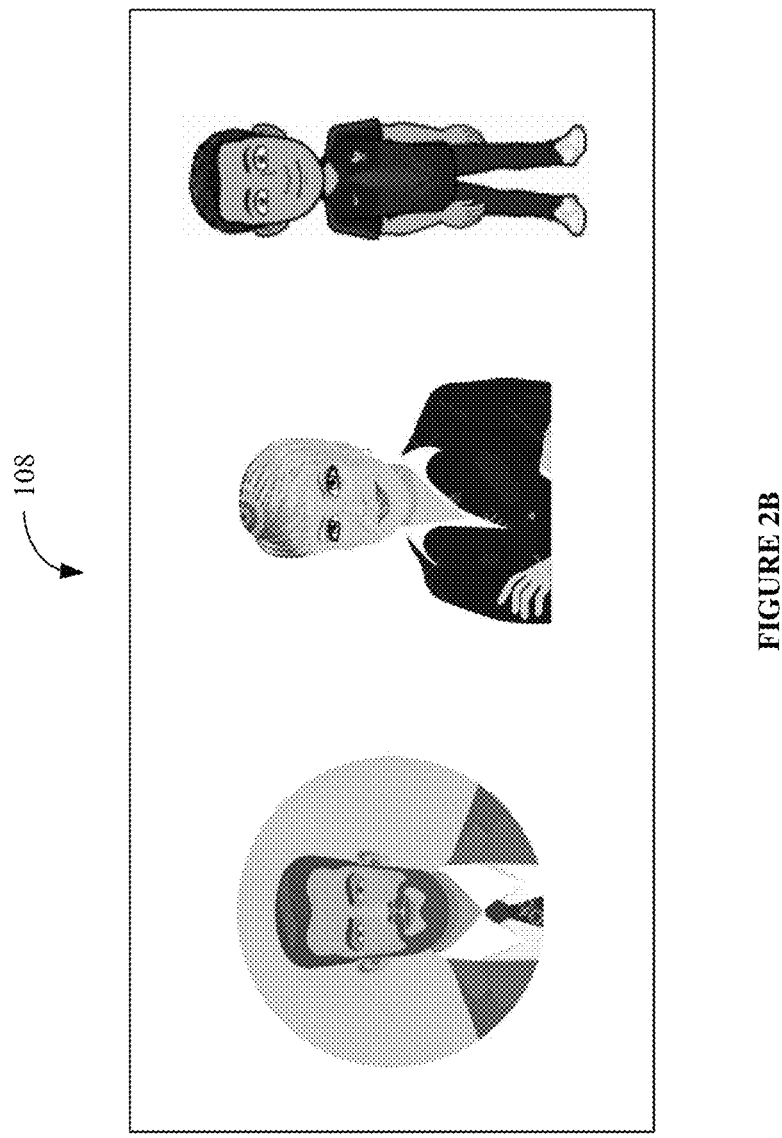
FIG. 2B shows an exemplary generated unique avatar, in accordance with some embodiments of the present disclosure.

In an embodiment, the avatar generation module (211) may be configured to generate the unique avatar indicative of the virtual user (108) corresponding to the physical user (101) based on the one or more user details stored in the user data (205). The avatar generation module (211) may generate the virtual user (108) with a unique identification value using the convolution neural network (CNN) based on the Artificial Intelligence (AI) technique. For example, three virtual users generated using CNN corresponding to the user gender of Male, Female, Male with the user age of 28, 57, 13 respectively is shown in FIG. 2B.

Figure 2C:
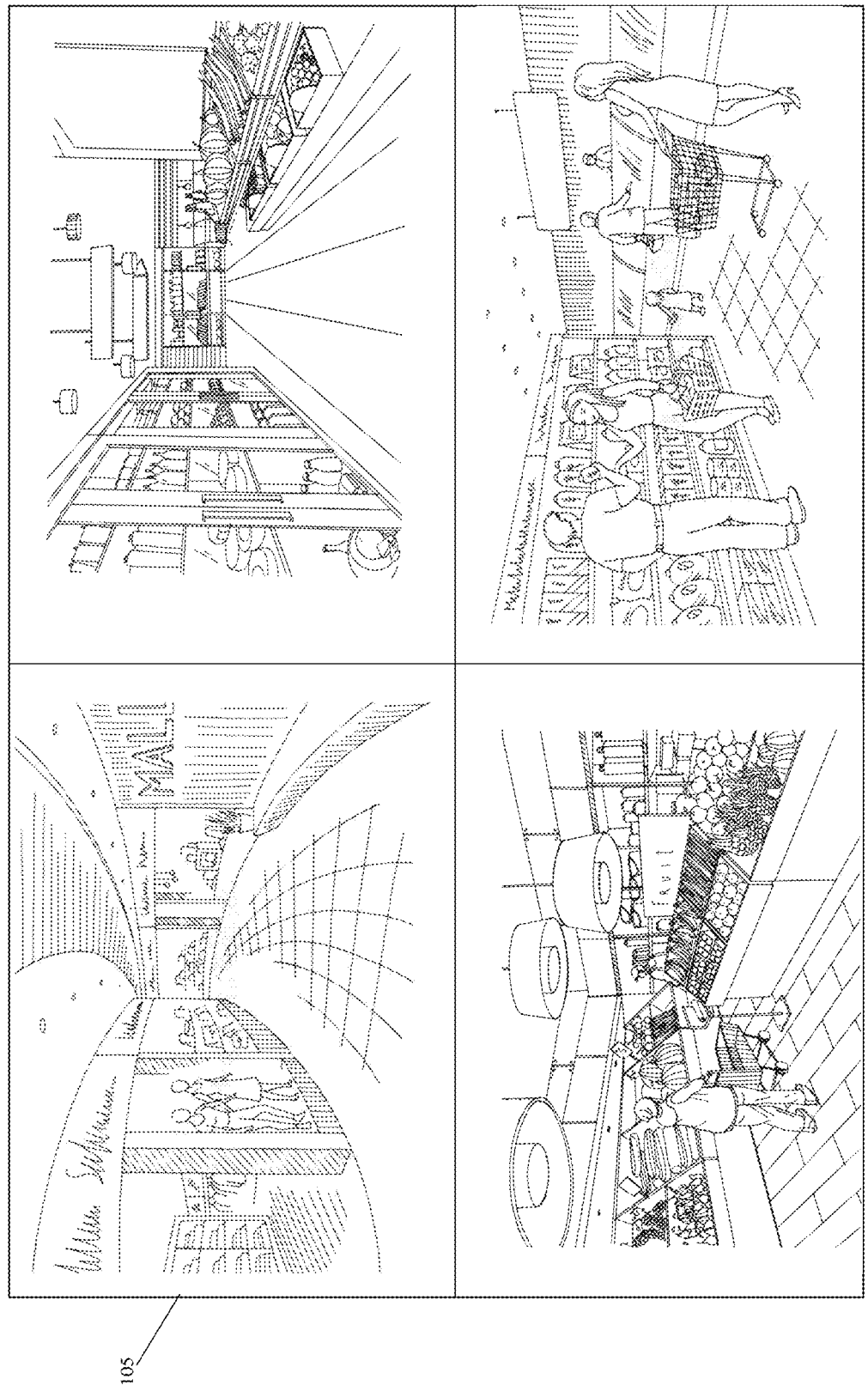
FIG. 2C shows an example one or more virtual stores, in accordance with some embodiments of the present disclosure.

In an embodiment, the virtual environment generation module (212) may be configured to receive the real-time video of the one or more physical stores from a first server. The first server may be associated with the one or more physical stores. Further, the first server may be configured to receive the real-time video from the plurality of cameras housed in the one or more physical stores. The virtual environment generation module (212) may process the real-time video based on one or more virtual reality techniques and one or more augmented reality techniques to generate the virtual environment (105). For example, one or more virtual reality techniques and one or more augmented reality techniques may include an oculus rift, holo-lens and the like. In another example, the virtual environment (105) generated for the one or more physical stores is shown in FIG. 2C.

In an embodiment, the optimal path generation module (213) may be configured to initialize the current state vector based on the one or more shopping details. The current state vector is indicative of the one or more goods to be purchased from one or more racks in the at least one of the one or more virtual stores. Further, the optimal path generation module (213) may be configured to identify a restriction vector and an exception vector based on the one or more user details and the one or more goods in the physical store. The restriction vector is indicative of the one or more racks with restricted access to the virtual user and the exception vector is indicative of obstacles near the one or more racks. Furthermore, the optimal path generation module (213) may be configured to generate the optimal path using the graph neural network based on the current state vector, the restriction vector, and the exception vector. Thereafter, the optimal path generation module (213) may be configured to update the optimal path after at least one of a predefined time interval and completion of purchasing the one or more goods in a first rack from the one or more racks.

In an embodiment, the navigation module (214) may be configured to facilitate the virtual user to traverse along the one or more racks in the at least one of the one or more virtual stores based on the optimal path. The virtual user purchases the one or more goods in the one or more racks.

In an embodiment, the other module (215) may be used to receive the real-time video from the one or more physical stores, the one or more physical store details, the one or more shopping details and the one or more user details from the physical user (101) via the VR device (102) and the like.

Figure 3:
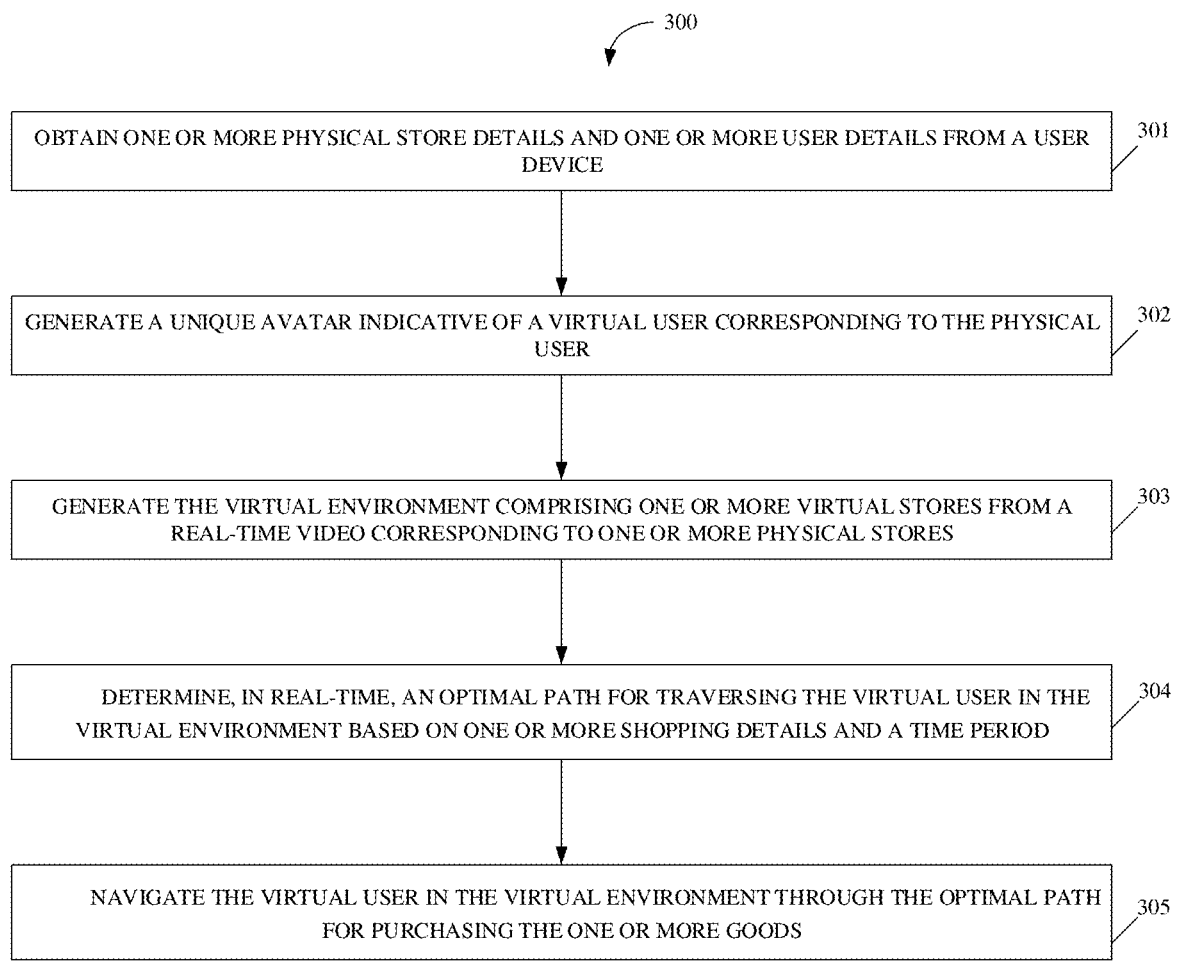
FIG. 3 shows a flowchart illustrating method steps for purchasing one or more goods from a physical store through a virtual environment, in accordance with some embodiment of the present disclosure.

FIG. 3 shows a flowchart illustrating method steps for for purchasing one or more goods from a physical store through a virtual environment (105), in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the computing system (103) may obtain one or more physical store details and one or more user details from a user device (102) for authenticating a physical user (101).

In an embodiment, the computing system (103) may obtain the one or more physical store details by receiving from the physical user (101) via the user device (102) at least one of the name, the location, and the type of the one or more physical store. In a first example, the one or more physical store details from the physical user (101) may include a "Shop—A" at a "location—A" for purchasing "groceries", a "Shop—B" at a "location—B" for purchasing "apparels" and a "Shop—C" at a "location—C" for purchasing "electronic goods". In a second example, the one or more physical store details from the physical user (101) may include a "Shop—D" for purchasing "groceries", a "Shop—E" for purchasing "footwear" at a "Shopping mall—1" at a "location—A".

In an embodiment, the computing system (103) may obtain the one or more user details by receiving from the physical user (101) via the user device (102), at least one of the user credentials, the user age, the user gender, the user preferences, the biometric data, the one-time password and the payment information. For example, the user credentials may include a name associated with the physical user (101), a static password to interact with the virtual environment (105) via the VR device (102), the user age may be value in a range of 10 to 90, the user gender may include "Male" or "Female", the user preferences may include frequently purchased (or user-preferred) one or more goods, frequently visited (or user-preferred) one or more physical stores and the like, the biometric data may include a fingerprint, a facial information, iris information and the like, and the payment information may include a payment card number, CVV, expiry date, internet banking information, e-wallet payment information and the like. The one or more details including the user age, the user gender, the user preferences, the biometric data, and the payment information may be used to enroll the physical user (101) for purchasing the one or more goods from the one or more physical stores and maybe received once from the physical user (101). Further, one or more details including the user credentials, the biometric data, and the one-time password may be received each time the physical user (101) wants to purchase the one or more goods.

At the step 302, upon successful authentication of the physical user (101), the computing system (103) may generate a unique avatar indicative of a virtual user corresponding to the physical user (101) based on the one or more user details.

In an embodiment, the computing system (103) may authenticate the physical user (101) by receiving from the physical user (101) at least one of a biometric data, and a one-time password. Further, the computing system (103) may provide at least one of the biometric data, user credentials and the one-time password to the store coordinator (107) of the one or more physical stores for verification. The store coordinator (107) may use the VR device (102) to receive the one or more user details from the computing system (103). Further, the store coordinator (107) may verify (or compare) the received one or more user details with a previously stored one or more user details received during an enrollment of the physical user (101). The verification of the one or more user details may be performed using the one or more cryptographic techniques, for example, public-key cryptosystems, private key cryptosystems and the like. Furthermore, the computing system (103) may receive from the store coordinator (107) via the VR device (102) the result of the verification indicative of one of the successful authentication or the unsuccessful authentication. In case of unsuccessful authentication, the computing system (103) may indicate to the physical user (101) via the VR device (102) for re-authentication or deny permission to purchase the one or more goods using the virtual environment (105). In case of successful authentication, the physical user (101) is permitted to purchase the one or more goods using the virtual environment (105).

Figure 4A:
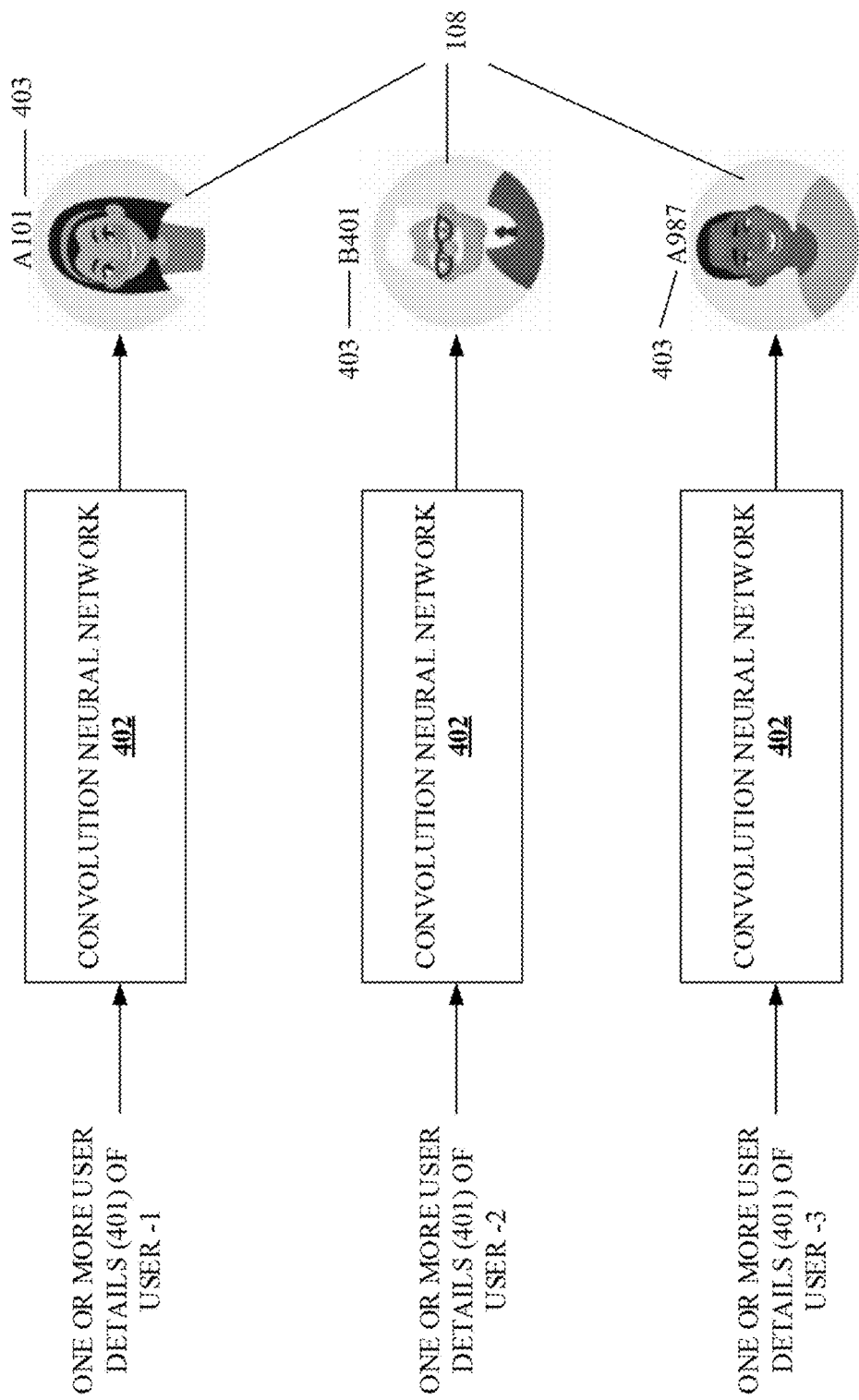
FIG. 4A shows an exemplary generation of virtual user, in accordance with some embodiments of the present disclosure.

In an embodiment, the computing system (103) may generate the unique avatar by generating the virtual user with the unique identification value (403) using the convolution neural network (CNN) (402) based on Artificial Intelligence (AI) technique using the one or more user details (401) received from the physical user (101) as shown in FIG. 4A. In an embodiment, the computing system (103) generates the virtual user corresponding to each of the one or more physical stores. For example, if the physical user (101) wants to purchase one or more goods from 5 physical stores, the computing system (103) may generate 5 virtual users corresponding to 5 physical stores.

Referring back to FIG. 3, at the step 303, the computing system (103) may generate the virtual environment (105) comprising the one or more virtual stores from the real-time video corresponding to one or more physical stores based on the one or more physical store details. Where the virtual environment (105) is provided to the user device (102).

Figure 4B:
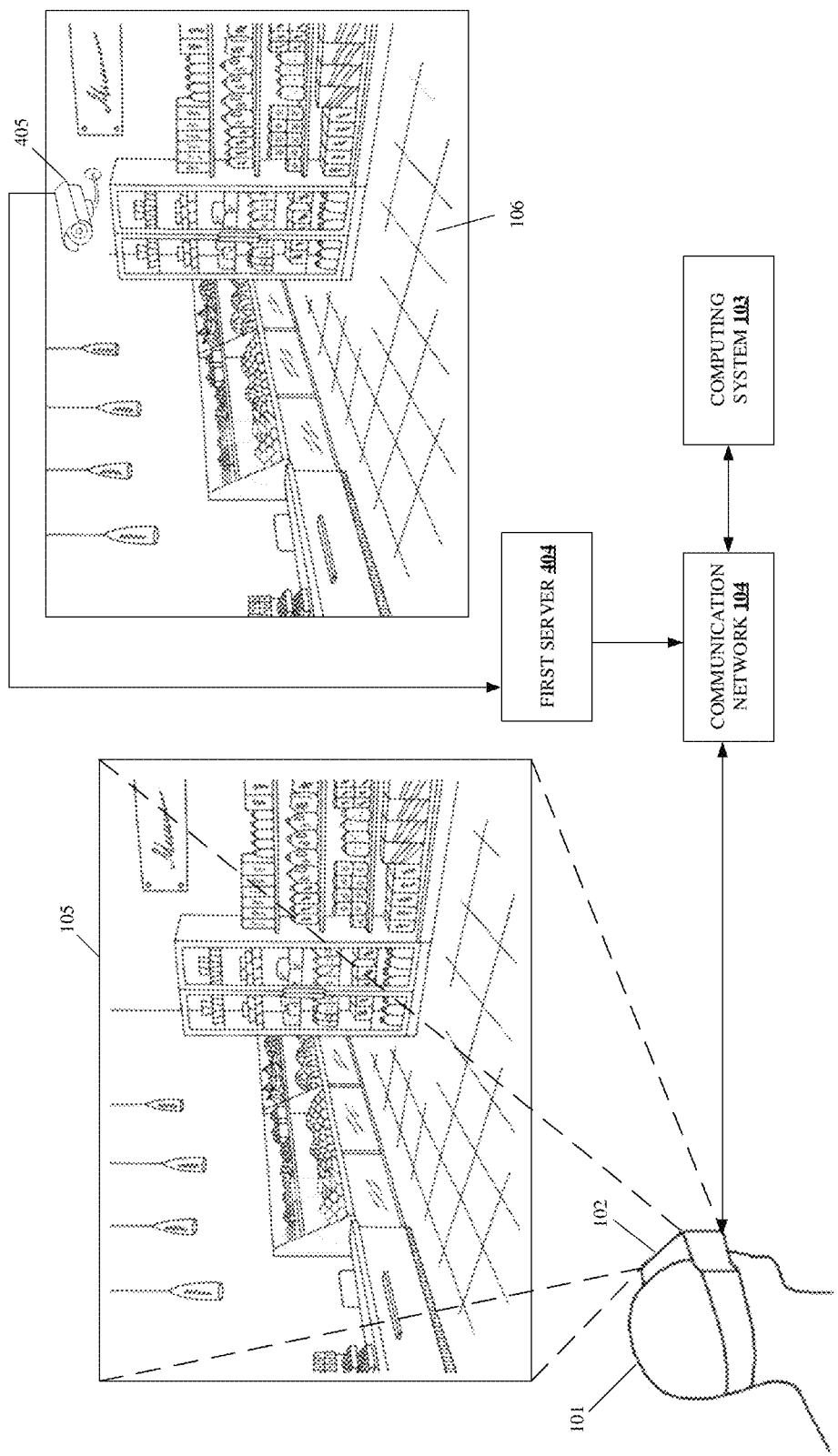
FIG. 4B shows an exemplary real-time video converted into a virtual environment, in accordance with some embodiments of the present disclosure.
Figure 4C:
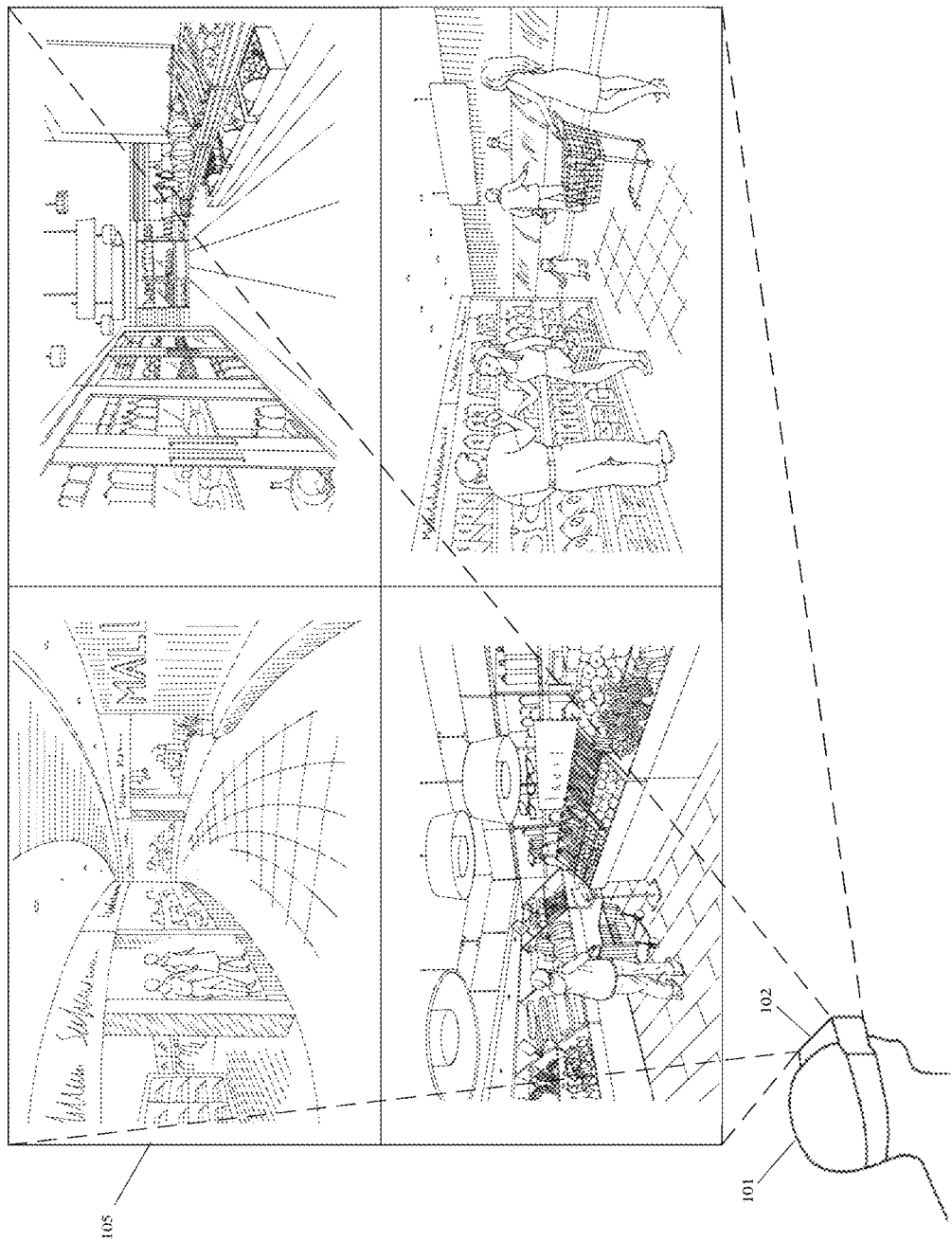
FIG. 4C shows an exemplary one or more virtual stores displayed in a VR device, in accordance with some embodiments of the present disclosure.

In an embodiment, the computing system (103) may generate the virtual environment (105) by receiving the real-time video of the one or more physical stores from the first server (404) as shown in FIG. 4B. The first server (404) associated with the one or more physical stores may receive the real-time video from the plurality of cameras (405) housed in the one or more physical stores as shown in FIG. 4B. Further, the computing system (103) may process the real-time video based on one or more virtual reality techniques and one or more augmented reality techniques to generate the virtual environment (105) as shown in FIG. 4B. For example, one or more virtual reality techniques and one or more augmented reality techniques may include an oculus rift, holo-lens and the like. The virtual environment (105) includes the one or more objects present in the real-time video. For example, the one or more objects may include one or more physical users present in the one or more physical store, the one or more virtual users, the one or more goods in the one or more physical store, the virtual store coordinator, the one or more racks and the like. In an embodiment, if the physical user (101) wants to shop from the 4 physical stores present at different locations, the computing system (103) may receive the real-time video from the first server (404) associated with the 4 physical stores. The VR device (102) may display the virtual environment (105) corresponding to the 4 physical stores simultaneously by partitioning the display device associated with the VR device (102) into 4 logical parts as shown in FIG. 4C.

Referring back to FIG. 3, at the step 304, the computing system (103) may determine, in real-time, an optimal path for traversing the virtual user in the virtual environment (105) based on the one or more shopping details and the time period associated with the one or more shopping details, received from the physical user (101).

In an embodiment, the one or more shopping details may include the one or more goods to be purchased from at least one of the one or more virtual stores corresponding to the one or more physical stores within the time period. The computing system (103) may receive the one or more shopping details from the physical user (101) via the VR device (102). For example, the one or more shopping details may include [Milk—1 bottle, cookies—4 packets, Rice—5 kilograms, Shirts—4, Trousers—2, headphone speaker—1, footwear—2 pairs and the like] and the time period may include 15 minutes, 30 minutes and the like.

In an embodiment, the computing system (103) may determine the optimal path in real-time by initializing a current state vector based on the one or more shopping details. The current state vector may be indicative of the one or more goods to be purchased from one or more racks in the at least one of the one or more virtual stores. The current state vector may include plurality of binary values including a "zero" or a "one" and the size of current state vector may be equal to at least one of a total number of departments (for example, fruits department, grocery department, footwear department, kids department, and the like) in the one or more physical store, one or more racks in the one or more physical stores and the like. Initially, the one or more binary values among the plurality of binary values in the current state vector may be set to "one" for the corresponding one or more goods to be purchased by the physical user (101) based on the one or more shopping details. After setting the one or more binary values to "one", remaining one or more binary values among the plurality of binary values may be set to "zero". For example, the current state vector based on the one or more shopping details is as shown:

Current state vector=[0, 1, 0, 0, 1, 1]

The plurality of binary values may correspond to [Shirts, Trousers, Footwear, Television, Medicine, Grocery] in the first physical store.

In an embodiment, the computing system (103) may identify the restriction vector and the exception vector based on the one or more user details (401) and the one or more goods in the physical store. The restriction vector may be indicative of the one or more racks with restricted access to the virtual user and the exception vector may be indicative of obstacles near the one or more racks. For example, the one or more racks containing the one or more goods (i.e. alcohol, cigarette and the like) may be restricted to the virtual user having the age less than "18". Therefore, the corresponding binary value may be set to "one" in the restriction vector. In another example, the one or more racks may contain the one or more goods at a discounted price. Consequently, the plurality of physical users and the plurality of virtual users may be present in the vicinity of the one or more racks containing the one or more goods at the discounted price. The computing system (103) may set the binary value corresponding to the one or more racks as "one" in the expectation vector. The restriction vector and the expectation vector, for example, may be as shown:

Restriction vector=[0, 0, 0, 0, 0, 1]
Exception vector=[1, 0, 0, 1, 0, 0].

Figure 4D:
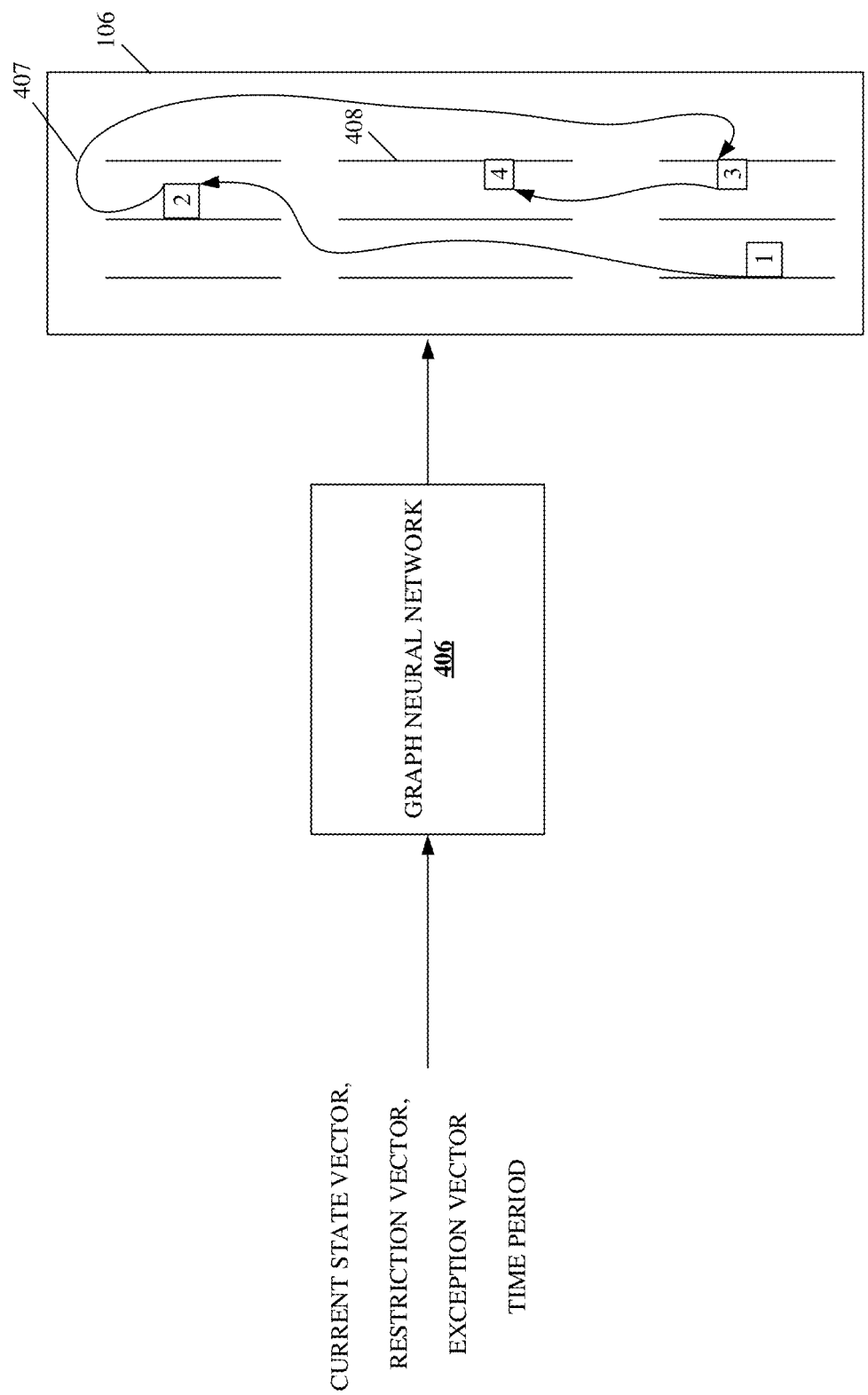
FIG. 4D shows an exemplary generation of an optimal path, in accordance with some embodiments of the present disclosure.

In an embodiment, the computing system (103) may generate the optimal path using the graph neural network (406) based on the current state vector, the restriction vector, and the exception vector. The graph neural network (406) may be based on the deep reinforcement learning technique. The graph neural network (406) takes the current state vector, the restriction vector, the exception vector and the time period as an input and provides an optimal path (407) as an output as shown in FIG. 4D. The optimal path (407) is indicative of an order in which the virtual user needs to navigate the one or more racks (408) in the one or more virtual stores based on the current state vector indicating the one or more goods to be purchased with in the time period. Further, the optimal path (407) may be generated based on the restriction vector, and the exception vector. For example, the one or more racks (408) in the restricted vector of the virtual user may not be included in the optimal path (407) and the one or more racks (408) in the exception vector of the virtual user may be ordered at the last to complete the purchase of the one or more goods within the time period. In an embodiment, the optimal path (407) is computed for each of the one or more virtual stores based on the corresponding one or more shopping details.

Referring back to FIG. 3, at the step 305, the computing system (103) may navigate the virtual user in at least one of the one or more virtual stores in the virtual environment (105) through the optimal path (407) for purchasing the one or more goods from the physical store corresponding to the at least one of the one or more virtual stores.

In an embodiment, the computing system (103) may traverse the virtual user along the one or more racks (408) in the at least one of the one or more virtual stores based on the optimal path (407). The virtual user purchases the one or more goods in the one or more racks (408). Further, the computing system (103) may update the optimal path (407) after at least one of a predefined time interval (for example, 1 minute, 5 minutes and the like) and the completion of purchasing the one or more goods in a first rack from the one or more racks (408). The computing system (103) updates the restriction vector and the exception vector after the predefined time interval based on the one or more user details (401) and the plurality of physical users and the plurality of the virtual users in the one or more virtual stores corresponding to the one or more physical stores. Further, the computing system (103) updates the current state vector by setting the binary value to "zero" corresponding to the one or more goods purchased by the physical user (101). Further, the updated current state vector, the restriction vector, the exception vector and remaining time from the time period is provided to the graph neural network (406) for generating the updated optimal path (407). The optimal is updated until the expiry of the time period.

In an embodiment, the store coordinator (107) may use the VR device (102) and monitor the virtual environment (105) corresponding to the one or more virtual stores via the virtual store coordinator. The virtual store coordinator may monitor the behavior of the virtual user, authenticate the user credentials, identify one or more virtual users trying to block access to one or more racks (408) in the one or more virtual stores, identify one or more virtual users forming group and obstructing other virtual users and the like. Further, the virtual store coordinator may guide the virtual user on the purchase of the one or more goods or guide the virtual user on identification of the one or more goods and the like.

In an embodiment, the physical user (101) may initiate the payment transaction via the VR device (102) and the computing system (103) after purchasing the one or more goods based on the user credentials. The computing system (103) may indicate to the store coordinator (107) a successful completion of the payment transaction and the store coordinator (107) may deliver the one or more goods purchased to the physical user (101).

In an embodiment, the physical user (101) "John" is a football fan and watches the match regularly. When the match is scheduled, the physical user (101) needs to go for shopping of one or more goods. The physical user (101) purchases the one or more goods via the VR device (102) and keeps watching the match. The computing system (103) generates the virtual user and obtains the one or more shopping details to be purchased and the time period for completing the shopping. The virtual avatar completes the shopping on behalf of "John" by displaying the virtual environment (105) as the virtual user navigates in the one or more virtual stores.

In an embodiment, the physical user (101) "Sam" is very busy and wants to buy the one or more goods from one or more physical stores. "Sam" is worried about going to one or more physical stores due to lack of parking space in the one or more physical stores. The physical user (101) using the VR device (102) purchases the one or more goods from one or more virtual stores corresponding to the one or more physical stores at a same time using the corresponding virtual user of the one or more virtual stores in parallel.

The method of purchasing the one or more goods from the one or more physical stores through the virtual environment (105) provides experience of the reality shopping to the physical user (101). Further, the physical user (101) may purchased one or more goods from the one or more physical stores simultaneously. The virtual environment (105) comprises one or more virtual stores based on the real-time video from the one or more physical stores in parallel. The virtual store coordinator manages, authenticates and monitors the virtual user in the virtual environment (105).

Computer System

Figure 5:
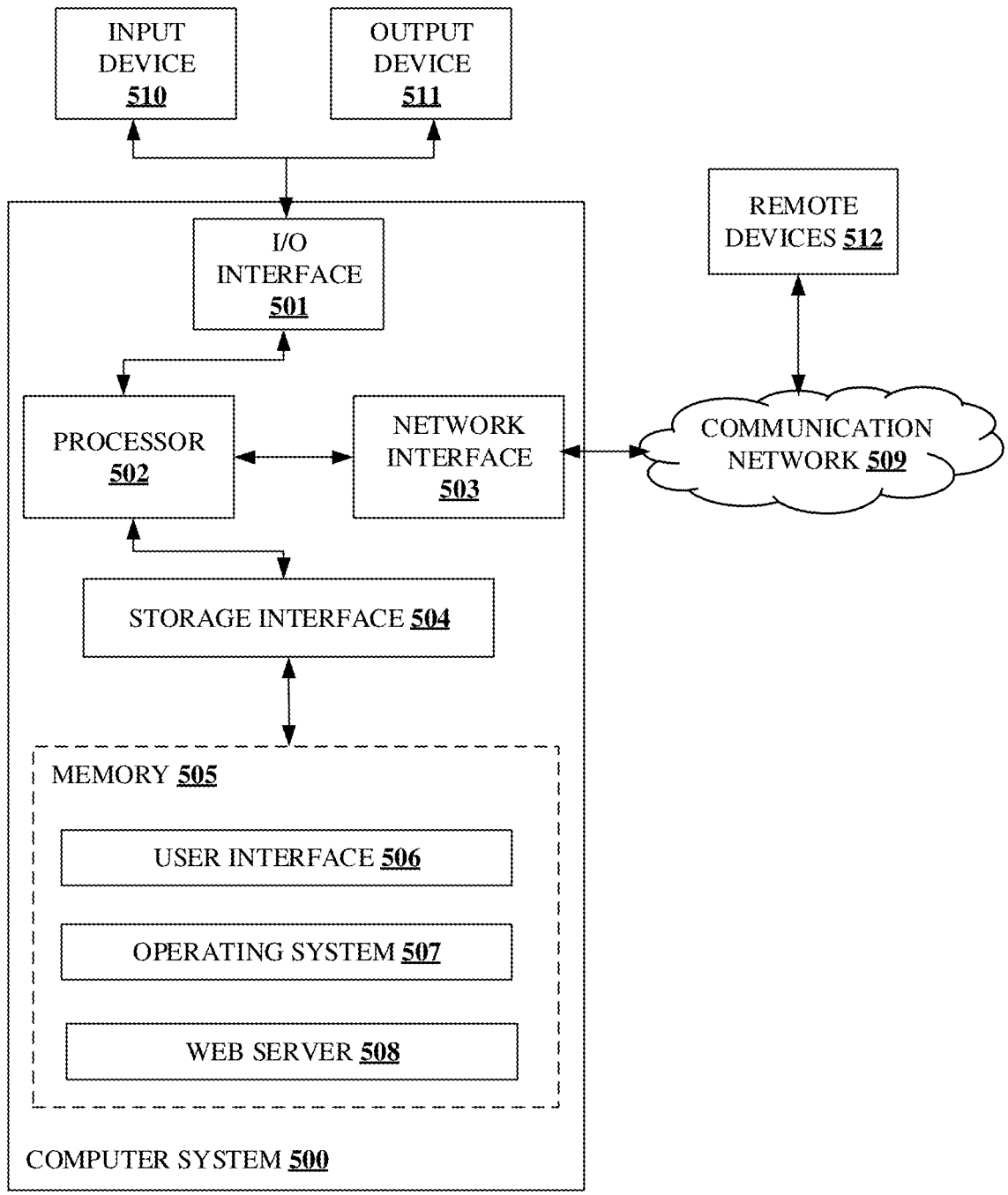
FIG. 5 shows an exemplary computer system for purchasing one or more goods from a physical store through a virtual environment, in accordance with some embodiments of the present disclosure.

FIG. 5 illustrates a block diagram of an exemplary computer system (500) for implementing embodiments consistent with the present disclosure. In an embodiment, the computer system (500) may be used to implement the method for purchasing one or more goods from a physical store through a virtual environment (105). The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (501), the computer system (500) may communicate with one or more I/O devices. For example, the input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some embodiments, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, HTML, ADOBE® FLASH®, JAVASCRIPT®, JAVA®, Application Programming Interfaces (APIs), etc. In some embodiments, the computer system (500) may implement a mail server stored program component not shown in the Figure). The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In some implementation, the one or more user details (401), the one or more physical store details, and the one or more shopping details may be received from the remote devices (512). In an embodiment, the remote devices (512) may be the VR device (102).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

REFERRAL NUMERALS

| Reference number | Description |
| --- | --- |
| 101 | Physical user |
| 102 | VR device |
| 103 | Computing system |
| 104 | Communication network |
| 105 | Virtual Environment |
| 106 | Physical store |
| 107 | Store Coordinator |
| 108 | Virtual User |
| 201 | I/O Interface |
| 202 | Memory |
| 203 | Processor |
| 204 | Data |
| 205 | User Data |
| 206 | Store Data |
| 207 | Virtual Environment data |
| 208 | Path Data |
| 209 | Other Data |
| 210 | Modules |
| 211 | Avatar Generation Module |
| 212 | Virtual Environment Generation Module |
| 213 | Optimal Path Generation Module |
| 214 | Navigation Module |
| 215 | Other Module |
| 401 | User Details |
| 402 | Convolution Neural Network |
| 403 | Unique Identification value |
| 404 | First Server |
| 405 | Camera |
| 406 | Graph Neural Network |
| 407 | Optimal Path |
| 408 | Racks |
| 500 | Computer System |
| 501 | I/O interface |
| 502 | Processor |
| 503 | Network Interface |
| 504 | Storage Interface |
| 505 | Memory |
| 506 | User Interface |

-continued

| Reference number | Description |
| --- | --- |
| 507 | Operating System |
| 508 | Web Server |
| 509 | Communication Network |
| 510 | Input Device |
| 511 | Output Device |
| 512 | Remote Devices |

We claim:

1. A method of purchasing one or more goods from a physical store through a virtual environment, the method comprising:

obtaining, by a computing system, one or more physical store details and one or more user details from a user device for authenticating a physical user;

upon successful authentication of the physical user, generating, by the computing system, a unique avatar indicative of a virtual user corresponding to the physical user based on the one or more user details;

generating, by the computing system, the virtual environment comprising one or more virtual stores from a real-time video corresponding to one or more physical stores based on the one or more physical store details, wherein the virtual environment is provided to the user device;

determining, by the computing system in real-time, an optimal path for traversing the virtual user in the virtual environment based on one or more shopping details and a time period for completing the shopping of the one or more shopping details, received from the physical user, wherein determining the optimal path in real-time using a graph neural network that takes the current state vector, the restriction vector, the exception vector and the time period as an input and provides the optimal path as an output, wherein the current state vector is indicative of the one or more goods to be purchased from one or more racks in the at least one of the one or more virtual stores, and wherein the restriction vector is indicative of the one or more racks with restricted access to the virtual user and the exception vector is indicative of obstacles near the one or more racks; and navigating, by the computing system, the virtual user in at least one of the one or more virtual stores in the virtual environment through the optimal path for purchasing the one or more goods from the one or more physical stores corresponding to the at least one of the one or more virtual stores;

updating, by the computing system, the optimal path after a predefined time interval and a completion of purchasing of at least one good among the one or more goods in a first rack from the one or more racks, until the expiry of the time period for completing the shopping, by:

updating, the current state vector, the restriction vector, the exception vector and remaining time from the time period, after the predefined time interval based on the one or more user details, the plurality of physical users, the plurality of the virtual users in the one or more virtual stores corresponding to the one or more physical stores.

2. The method as claimed in claim 1, wherein obtaining the one or more physical store details comprises:

receiving from the physical user via the user device at least one of a name, a location, and a type of the one or more physical store.

3. The method as claimed in claim 1, wherein obtaining the one or more user details comprises:

receiving from the physical user via the user device, at least one of user credentials, a user age, a user gender, user preferences, a biometric data, a one-time password or payment information.

4. The method as claimed in claim 1, wherein authenticating the physical user comprises:

receiving from the physical user at least one of a biometric data, and a one-time password;

providing to a store coordinator for verifying the at least one of the biometric data, and the one-time password; and receiving from the store coordinator a result of the verification indicative of one of the successful authentication or an unsuccessful authentication.

5. The method as claimed in claim 1, wherein generating the unique avatar comprises:

generating the virtual user with a unique identification value using a convolution neural network (CNN) based Artificial Intelligence (AI) technique based on the one or more user details received from the physical user.

6. The method as claimed in claim 1, wherein generating the virtual environment comprises:

receiving the real-time video of the one or more physical stores from a first server; and processing the real-time video based on one or more virtual reality techniques and one or more augmented reality techniques to generate the virtual environment.

7. The method as claimed in claim 1, wherein the one or more shopping details comprises the one or more goods to be purchased from at least one of the one or more virtual stores within the time period.

8. The method as claimed in claim 1, wherein determining the optimal path in real-time comprises:

upon receiving the shopping detail and the time period for completing the shopping, initializing the current state vector based on the one or more shopping details, and identifying the restriction vector and the exception vector based on the one or more user details and the one or more goods in the physical store.

9. The method as claimed in claim 1, wherein navigating the virtual user comprises:

traversing the virtual user along one or more racks in the at least one of the one or more virtual stores based on the optimal path, prior to the predefined time interval, wherein the virtual user purchases the one or more goods in the one or more racks; and in real time, updating the optimal path after at least one of the predefined time interval and a completion of purchasing the one or more goods in a first rack from the one or more racks, wherein the virtual user is traversed along one or more racks in the at least one of the one or more virtual stores based on the updated optimal path.

10. The method as claimed in claim 1, further comprises: initiating a payment transaction after purchasing the one or more goods based on a user credentials.

11. A computing system, for purchasing one or more goods from a physical store through a virtual environment, the computing system comprises:

a processor; and
a memory communicatively coupled to the processor, wherein the memory stores processor executable instructions, which, on execution, cause the processor to:
  obtain one or more physical store details and one or more user details from a user device for authenticating a physical user;
  upon successful authentication of the physical user, generate a unique avatar indicative of a virtual user corresponding to the physical user based on the one or more user details;
  generate the virtual environment comprising one or more virtual stores from a real-time video corresponding to one or more physical stores based on the one or more physical store details, wherein the virtual environment is provided to the user device;
  determine, in real-time, an optimal path for traversing the virtual user in the virtual environment based on one or more shopping details and a time period for completing the shopping of the one or more shopping details, received from the physical user,
    wherein determining the optimal path in real-time using a graph neural network that takes the current state vector, the restriction vector, the exception vector and the time period as an input and provides an optimal path as an output,
      wherein the current state vector is indicative of the one or more goods to be purchased from one or more racks in the at least one of the one or more virtual stores wherein the restriction vector is indicative of the one or more racks with restricted access to the virtual user and the exception vector is indicative of obstacles near the one or more racks;
  navigate the virtual user in at least one of the one or more virtual stores in the virtual environment through the optimal path for purchasing the one or more goods from the physical store corresponding to the at least one of the one or more virtual stores,
  update, the optimal path after at least one of a predefined time interval and a completion of purchasing the one or more goods in a first rack from the one or more racks, until the expiry of the time period for completing the shopping, by:
    updating, the current state vector, the restriction vector, the exception vector and remaining time from the time period, after the predefined time interval based on the one or more user details, the plurality of physical users, the plurality of the virtual users in the one or more virtual stores corresponding to the one or more physical stores.

12. The computing system as claimed in claim 11, wherein the processor is configured to obtain the one or more physical store details comprises:
  receiving from the physical user via the user device at least one of a name, a location, and a type of the one or more physical store.

13. The computing system as claimed in claim 11, wherein the processor is configured to obtain the one or more user details comprises:
  receiving from the physical user via the user device, at least one of user credentials, a user age, a user gender, user preferences, a biometric data, a one-time password or payment information.

14. The computing system as claimed in claim 11, wherein the processor is configured to authenticate the physical user comprises:
  receiving from the physical user at least one of a biometric data, and a one-time password;
  providing to a store coordinator for verifying the at least one of the biometric data, and the one-time password; and
  receiving from the store coordinator a result of the verification indicative of one of the successful authentication or an unsuccessful authentication.

15. The computing system as claimed in claim 11, wherein the processor is configured to generate the unique avatar comprises:
  generating the virtual user with a unique identification value using a convolution neural network (CNN) based Artificial Intelligence (AI) technique based on the one or more user details received from the physical user.

16. The computing system as claimed in claim 11, wherein the processor is configured to generate the virtual environment comprises:
  receiving the real-time video of the one or more physical stores from a first server; and
  processing the real-time video based on one or more virtual reality techniques and one or more augmented reality techniques to generate the virtual environment.

17. The computing system as claimed in claim 11, wherein the processor is configured to receive the one or more shopping details comprises the one or more goods to be purchased from at least one of the one or more virtual stores within the time period.

18. The computing system as claimed in claim 11, wherein the processor is configured to determine the optimal path in real-time comprises:
  upon receiving the shopping detail and the time period for completing the shopping,
    initializing the current state vector based on the one or more shopping details,
    identifying the restriction vector and the exception vector based on the one or more user details and the one or more goods in the physical store.

19. The computing system as claimed in claim 11, wherein the processor is configured to navigate the virtual user comprises:
  traversing the virtual user along one or more racks in the at least one of the one or more virtual stores based on the optimal path, prior to the predefined time interval, wherein the virtual user purchases the one or more goods in the one or more racks; and
  in real time, updating the optimal path after at least one of the predefined time interval and a completion of purchasing the one or more goods in a first rack from the one or more racks,
    wherein the virtual user is traversed along one or more racks in the at least one of the one or more virtual stores based on the updated optimal path.

20. The computing system as claimed in claim 11, wherein the processor is further configured to initiate a payment transaction after purchasing the one or more goods based on a user credentials.

* * * * *